United States Patent
Müller et al.

(10) Patent No.: US 9,618,107 B2
(45) Date of Patent: Apr. 11, 2017

(54) TOOTHED WHEEL AND PUMP AGGREGATE WITH SUCH A TOOTHED WHEEL

(75) Inventors: Klaus Müller, Karlsruhe (DE); Sergei Gerz, Pfinztal (DE); Ralf Haas, Pfinztal (DE)

(73) Assignee: Grundfos Management a/s, Bjerringbro (DK)

( * ) Notice: Subject to any disclaimer, the term of this patent is extended or adjusted under 35 U.S.C. 154(b) by 1016 days.

(21) Appl. No.: 13/579,699

(22) PCT Filed: Feb. 16, 2011

(86) PCT No.: PCT/EP2011/000723
§ 371 (c)(1),
(2), (4) Date: Aug. 17, 2012

(87) PCT Pub. No.: WO2011/101120
PCT Pub. Date: Aug. 25, 2011

(65) Prior Publication Data
US 2012/0308413 A1    Dec. 6, 2012

(30) Foreign Application Priority Data
Feb. 18, 2010 (EP) .................. 10001642

(51) Int. Cl.
*F16H 55/18* (2006.01)
*F04B 9/02* (2006.01)
*F04B 43/02* (2006.01)

(52) U.S. Cl.
CPC ........... *F16H 55/18* (2013.01); *F04B 9/02* (2013.01); *F04B 43/021* (2013.01)

(58) Field of Classification Search
CPC .......... F04B 9/02; F04B 43/021; F04B 43/04; F16H 55/18; F16H 1/04; F16H 55/20; F16H 2055/185; Y10T 428/211
See application file for complete search history.

(56) References Cited

U.S. PATENT DOCUMENTS

| | | | | |
|---|---|---|---|---|
| 3,213,704 A | * | 10/1965 | McDougal | F16H 55/20 74/409 |
| 3,564,314 A | * | 2/1971 | Haydon | G01R 11/36 310/156.43 |
| 3,719,103 A | * | 3/1973 | Streander | F16H 55/18 74/440 |
| 3,847,507 A | * | 11/1974 | Sakiyama | B01L 3/0206 417/22 |

(Continued)

FOREIGN PATENT DOCUMENTS

DE  26 02 152 A1  9/1976
DE  42 25 374 A1  2/1994

(Continued)

*Primary Examiner* — Devon Kramer
*Assistant Examiner* — Joseph Herrmann
(74) *Attorney, Agent, or Firm* — McGlew and Tuttle, P.C.

(57) ABSTRACT

A toothed wheel (16) is provided with teeth, in which a cross section of a respective first section (24) of the tooth (23) has an outer contour that projects in at least one partial area of the outer contour relative to an outer contour of the adjoining second section (26) of the tooth (23), and is elastically designed and/or mounted, as well as a pump unit, in particular as a metering pump unit, with a drive having a toothed gearing with the toothed wheel.

16 Claims, 2 Drawing Sheets

(56) References Cited

U.S. PATENT DOCUMENTS

| | | | | | |
|---|---|---|---|---|---|
| 4,033,198 | A | * | 7/1977 | Seragnoli | ................ B65B 65/02 |
| | | | | | 74/432 |
| 4,298,575 | A | * | 11/1981 | Berglund | ............. B01L 3/0227 |
| | | | | | 222/309 |
| 5,249,932 | A | * | 10/1993 | Van Bork | ........... F04B 43/0081 |
| | | | | | 417/385 |
| 5,499,865 | A | * | 3/1996 | Katagiri | .................... B60T 7/12 |
| | | | | | 137/614.14 |
| 6,354,395 | B1 | * | 3/2002 | Cheng | .................. B62D 5/0409 |
| | | | | | 180/444 |
| 7,383,750 | B2 | * | 6/2008 | Menjak | ................... B23P 15/14 |
| | | | | | 74/409 |
| 2005/0183531 | A1 | * | 8/2005 | Hagihara | ................ F16H 55/16 |
| | | | | | 74/440 |
| 2008/0156574 | A1 | * | 7/2008 | Otsuki | ................ B62D 5/0409 |
| | | | | | 180/444 |
| 2009/0038852 | A1 | | 2/2009 | Heinrichs | |

FOREIGN PATENT DOCUMENTS

| | | | | |
|---|---|---|---|---|
| DE | 100 63 871 A1 | | 7/2002 | |
| GB | 833 273 A | | 4/1960 | |
| GB | 2224805 A | * | 5/1990 | ............. F16H 55/18 |
| JP | S53-97153 A | | 8/1978 | |
| JP | 1 135961 A | | 5/1989 | |
| JP | H01-249967 A | | 10/1989 | |
| JP | H02-173457 A | | 7/1990 | |
| JP | H06-156197 A | | 6/1994 | |
| JP | 10 246314 A | | 9/1998 | |
| JP | H10 246314 A | | 9/1998 | |
| JP | 2002-181162 A | | 6/2002 | |
| JP | 2009-47084 A | | 3/2009 | |
| WO | 2006/108466 A1 | | 10/2006 | |

\* cited by examiner

TOOTHED WHEEL AND PUMP AGGREGATE WITH SUCH A TOOTHED WHEEL

CROSS REFERENCE TO RELATED APPLICATIONS

This application is a United States National Phase application of International Application PCT/EP2011/000723 and claims the benefit of priority under 35 U.S.C. §119 of European Patent Application EP 10 001 642.7 filed Feb. 18, 2010, the entire contents of which are incorporated herein by reference.

FIELD OF THE INVENTION

The invention relates to a toothed wheel and a pump aggregate (pump unit), in particular to a metering pump unit with a drive, which has a toothed gearing with such a toothed wheel.

BACKGROUND OF THE INVENTION

Known in particular in metering pump units are toothed gearings that do not transfer a continuous drive movement, but are rather set in motion incrementally, for example via a stepping motor, so that they can controllably execute individual conveying strokes. As a result, the gearing experiences alternating loads or torques, which given the clearance between the individual toothed wheels can lead to an undesirable generation of noise. To avoid this, it has previously been known in such metering pump units to use a gearing with a toothed belt, wherein the toothed belt serves as an attenuator in the gearing. However, the disadvantage to the above is that it increases the size of the gearing, in addition to which a tensioning device must be provided for the toothed belt, and such a toothed belt is subject to wear.

SUMMARY OF THE INVENTION

In view of these problems, an object of the invention is to retain a compact size when setting up a pump unit with a toothed gearing that is resistant to wear, easy to assemble and generates no undesired noises, even given an alternating load.

According to the invention, the teeth each have at least two sections, in which the tooth contour in the cross section varies in design. One of the sections is provided primarily for torque transfer, while at least one other section is used to eliminate the clearance in the meshing with a combing toothed wheel. To this end, the cross section of at least one section of the tooth has an outer contour that projects in at least one partial area of the outer contour relative to the outer contour of an adjacent, second section of the tooth. The cross section extends normal to the longitudinal axis of the tooth, which extends parallel to the rotational axis in the case of a straight tooth system. As a result, this first section incorporates a portion that protrudes out of the tooth contour, so that the tooth in this section has a cross section that is larger at least in one direction than the cross section of the adjacent second section. In addition, at least this projecting partial contour of the first section has an elastic design and/or is elastically mounted. This projecting or protruding area of the outer contour of the first section is given large enough dimensions to allow it to mesh with a combing toothed wheel free of play. While meshing with the combing toothed wheel, this elastic, projecting area of the outer contour of the first tooth section is elastically deformed, in particular compressed, so that an abutment free of play is achieved between this first section of the tooth and the tooth profiles of the combing toothed wheel in this area in both loading directions of the meshing. By contrast, the second section of the tooth can be designed in a conventional way to optimize the torque transfer, in particular be made out of a sufficiently strong or rigid material, so as to also ensure the required resistance to wear. While the second section can have the usual clearance while meshing with a combing toothed wheel, the latter then no longer results in the undesired noises, since the overall clearance with the two toothed wheels meshing is eliminated by the first section of the tooth.

The teeth are preferably each designed in such a way that the first section of the tooth protrudes radially relative to the adjacent second section of the tooth, and is elastically configured and/or mounted. In other words, the toothed wheel in this embodiment has a larger pitch circle diameter in the first section with the elastic areas in a relaxed state than in the bordering second section. When meshed with a combing toothed wheel, the first section can elastically deflect radially inward or elastically buckle in a radial direction, ensuring an intermeshing free of play with a combing toothed wheel in this area. As a result, undesired noises do not arise between the toothed wheels, even given an alternating or reversing load.

The first section of the teeth is preferably arranged at a respective axial end of the tooth. The axial direction or longitudinal direction is here the direction in which the tooth extends transverse to the circumferential direction of the toothed wheel, i.e., parallel to the rotational axis given a straight tooth system, while the axis extends at a corresponding inclination in the case of an inclined tooth system. As an alternative, it is also possible to provide correspondingly designed first sections at both axial ends of the tooth.

It is further preferred that the first sections of several, preferably all, teeth lie on a shared circumferential line of the toothed wheel. In other words, the first sections of the teeth in which the projecting and elastically mounted or elastically designed parts of the outer contour are present are preferably all situated in the same position viewed in an axial direction. This ensures a uniform, continuous meshing with a combing toothed wheel with a uniform introduction of force.

In addition, the first section of each tooth preferably has a front edge running at an inclination relative to the rotational axis of the toothed wheel. In particular, if the tooth has a radially projecting section of the outer contour in the area of the first section, a continuous transition from the second section of the tooth to the largest tip diameter of the radially projecting area of the first section of the tooth can be created by having the front edge run at an inclination.

In another preferred embodiment, the first section of the teeth is resiliently joined with the adjacent second section of the tooth in a radial direction. This resilient connection can yield the elasticity necessary to keep the projecting areas of the outer contour of the first section abutting with the tooth profiles of a combing toothed wheel free of play.

In order to ensure a required mobility of the first sections of the teeth, the first section of the tooth can be separated from the first sections of the adjacent teeth by slits. In particular in cases where the first section of the tooth is elastically joined with the adjacent second section, this allows the first section to resiliently move in a radial direction independently of the first sections of the adjacent teeth, thereby coming to abut the tooth profiles of a combing toothed wheel free of play. As a result, the first sections are each designed as resilient tongues.

It is further preferred that the toothed wheel has a lower wall thickness in the area of the first section of the teeth than in the area of the second section of the teeth. In other words, the toothed wheel can be internally thinned out in the area of the first sections of the teeth, thereby ensuring the required elastic mobility of the first sections of the teeth radially inward. In this way, the first sections of the teeth can deflect radially inward.

It is preferred that the teeth and preferably the entire toothed wheel be made out of plastic. The teeth and entire toothed wheel can here be fabricated as a single piece out of the same plastic. As an alternative, it is also possible to interconnect different plastics, for example in a multi-component injection molding process. For example, the first and second sections of the teeth could be made out of different plastic materials. The first section of the tooth could be fabricated out of an elastic plastic, for example, and the second section out of a less elastic plastic, imparting the necessary elasticity to the first section, and the necessary rigidity to the second section for purposes of torque transfer.

As an alternative, it is also possible for the first section of the teeth to be made out of plastic, and the second section of the teeth to be made out of metal. Selecting a sufficiently elastic plastic makes it possible to achieve the required resilient effect of the first section, and the second section comprised of metal exhibits the necessary rigidity for torque transfer. This connection between plastic and metal can be positive-positive and/or non-positive, or also be brought about by joining a plastic material with the metal parts via injection molding.

The first section of the teeth preferably extends essentially over an area of 10 to 30% of the tooth width, further preferred essentially over 20% of the tooth width. As a consequence, the second section occupies the majority of the tooth width, so that the largest area of the tooth is used for torque transfer, and only a smaller portion is used to ensure meshing with a combing toothed wheel free of play.

The invention further relates to a pump unit, in particular a metering pump unit, which has a drive motor and a toothed gearing, wherein the toothed gearing contains a toothed wheel according to the preceding description. For example, such a pump unit can be a metering pump unit driven by an electric stepping motor for metering purposes. The stepping motor can use a toothed gearing to drive a cam, which in turn can drive a connecting rod that moves a positive-displacement body, preferably a membrane for conveying or metering a medium. In the simplest case, the toothed gearing can consist of an output gear on the shaft of the drive motor and a combing toothed wheel lying on a shaft with the described cam. The combing toothed wheel is here preferably designed according to the preceding description. If the drive motor is a stepping motor, the incremental rotation causes alternating loads or changes in the torque direction between the output gear and combing toothed wheel. Because the toothed wheel meshes free of play with the first sections of the teeth in the tooth system of the output gearing, the tooth profiles are prevented from colliding with each other, thereby ensuring a quiet, wear-free running, even when the drive motor is not continuously rotating.

As described, the toothed wheel with the first and second sections of the teeth preferably rotationally drives the cam so as to move a positive-displacement body. However, this driving motion need here not be achieved by arranging the toothed wheel and cam on the same shaft. Rather, driving can also take place indirectly, for example via additional gearing elements or toothed wheels.

The invention will be described below by example using the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
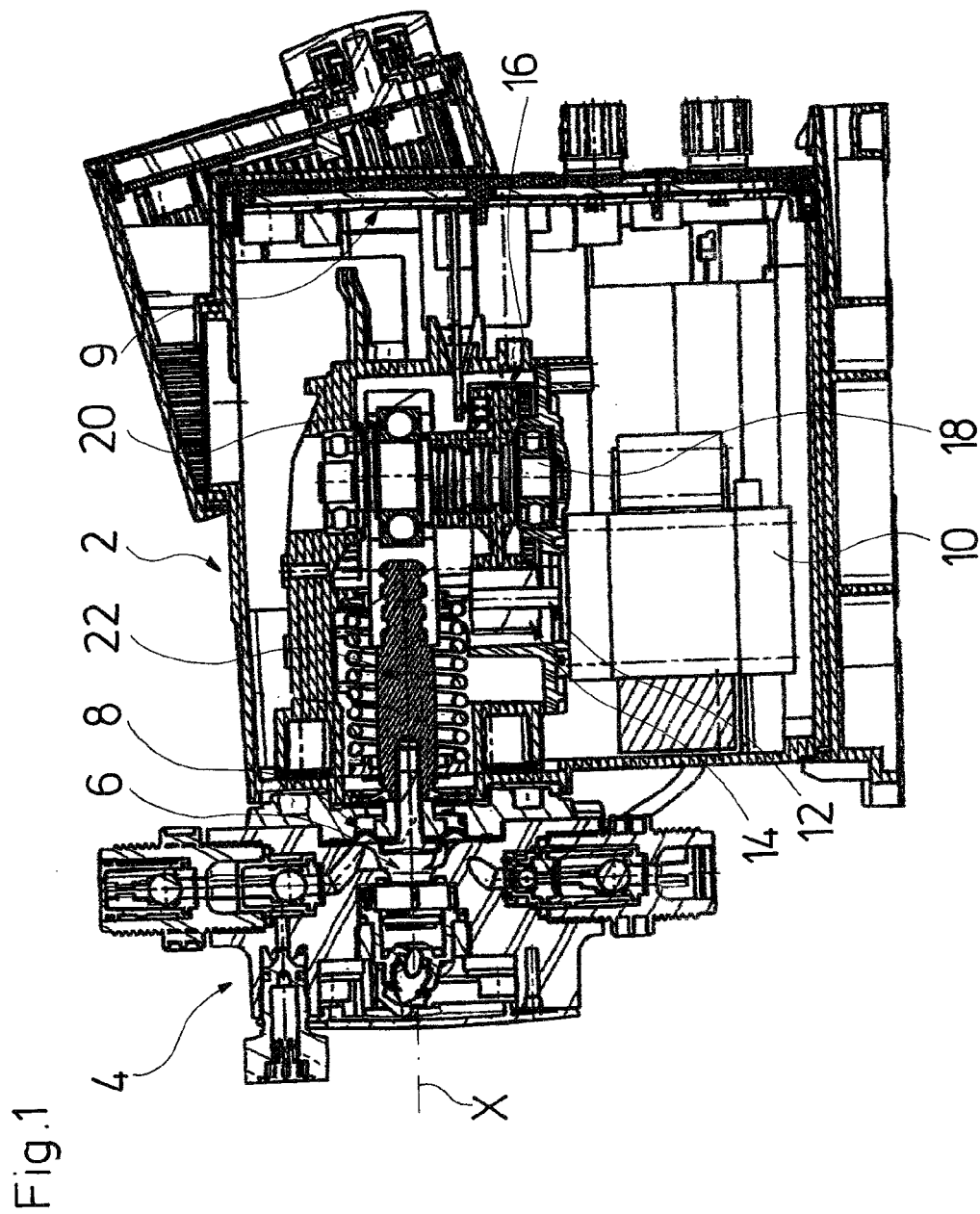
FIG. 1 is a sectional view of a metering pump unit with a gearing that incorporates a toothed wheel according to the invention.
Figure 2:
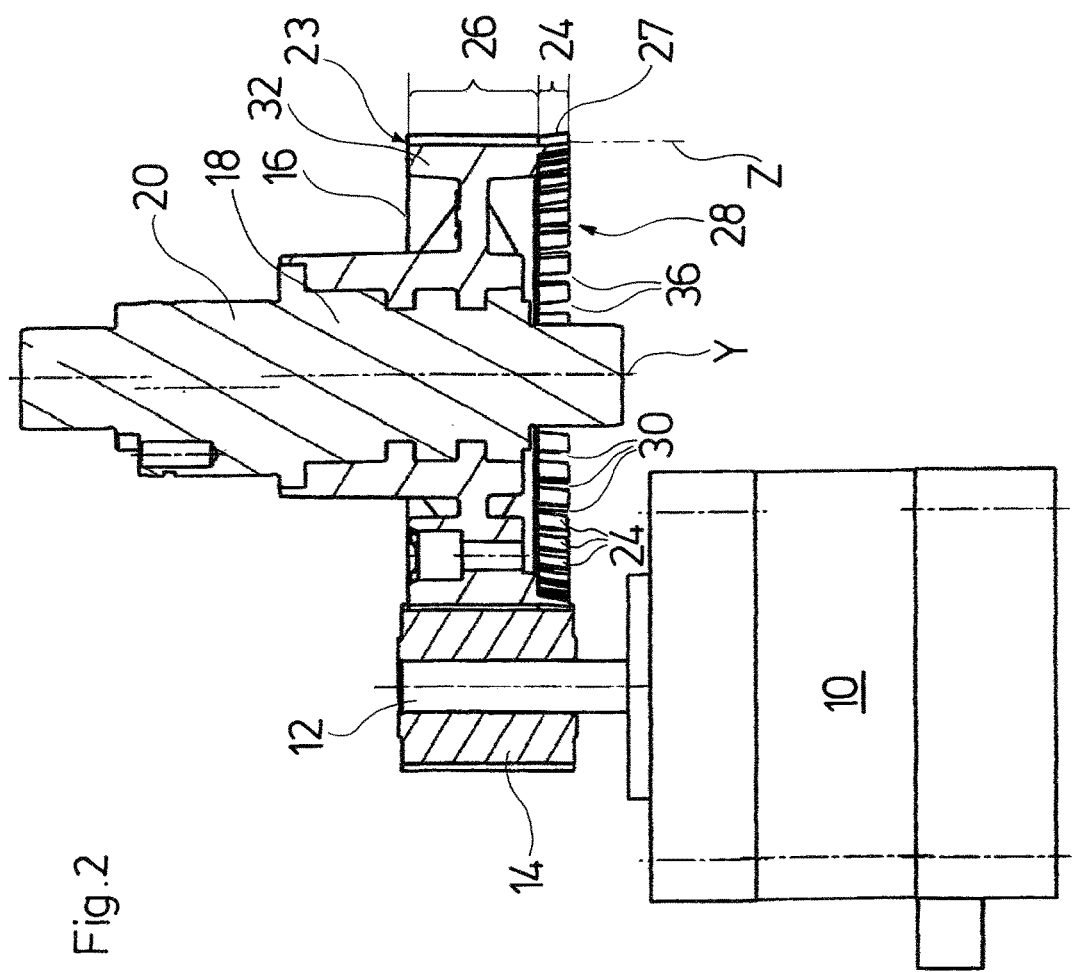
FIG. 2 is an enlarged view of the drive and intermeshing toothed wheels of the gearing according to FIG. 1.

Referring to the drawings in particular, the metering pump unit shown by example on FIG. 1 has a known drive casing 2 with a pump head 4 secured thereto. A metering chamber 6 with the accompanying line ports and valves is arranged in the pump head 4. The metering chamber 6 is bordered on one side by a membrane 8, which comprises the positive-displacement body, with which the volume of the metering chamber for pumping or conveying a medium can be contracted and expanded.

In addition to the actual drive, the drive casing 2 accommodates the required control and regulation electronics 9 in a known manner. The drive has an electric drive motor 10, which preferably is designed as a stepping motor. An output gear or pinion 14 is secured to the motor shaft 12 in a torsion-resistant manner. The pinion 14 meshes with a toothed wheel 16, which uses a shaft 18 bearing the toothed wheel 16 secured in a torsionally resistant manner to rotationally drive a cam 20. The cam 20 imparts an axially oscillating motion along the stroke or longitudinal axis X to a connecting rod 22. As a result, the connecting rod 22 generates the stroke motions of the membrane 8 needed for conveying or metering purposes.

Given a drive motor 10 designed as a stepping motor, the problem becomes that there is no continuously rotating motion by the motor shaft 12, but rather a turning motion composed of a plurality of individual steps. These produce alternating loads or torques in the gearing composed of the pinion 14 and toothed wheel 16, which in light of the clearance between the teeth of the pinion 14 and the toothed wheel 16 can lead to undesired noises and increased tooth wear. In order to avoid this, the toothed wheel 16 is designed in the manner described in the invention in such a way as to engage the pinion 14 free of play. To this end, the teeth 23 of the toothed wheel 16 each have a first section 24 and a second section 26 that adjoins in the longitudinal direction Z of the tooth 23. In the second section 26, the teeth 23 are designed in a conventional manner with the desired tooth profile for imparting a torque. In the first section 24 of the teeth 23, the tooth profile is designed in such a way that at least part of the cross section of the outer contour transverse to the longitudinal axis Z of the tooth protrudes relative to the outer contour of a cross section in the second section 26. In addition, this protruding area is elastic, so that it can come to completely abut the tooth profiles of the pinion 14 free of play. The first sections 24 of the teeth 23 all lie on the same axial side of the toothed wheel 16 at the axial end of the teeth 23.

In the present example, the protruding outer contour is achieved by having the first section 24 of the tooth 23 protrude radially outward, so that it has a larger pitch circle and tip diameter in this area than in the second section 26. The front edge 27 of the first sections 24 here projects outwardly at an inclination to the tooth longitudinal axis Z, i.e., the area of the tooth adjoining the second section 26 has the same pitch circle or tip diameter in the first section 24 as the tooth 23 in the second section 26. Proceeding from the transition to the second section 26, the tooth 23 in the first section 24 extends toward the axial side 28 of the toothed wheel 16 radially outward relative to the rotational axis Y of the toothed wheel 16. This means that the pitch circle diameter increases toward the axial side 28, so that the first section 24 projects radially relative to the second section 26.

The first sections 24 of the teeth 23 are elastically joined with the respective adjoining second sections 26. The elastic design of the first sections 24 is achieved primarily by thinning out the material. Slits 30 are arranged between the first sections 24 of the individual teeth 23, so that the first sections 24 of the teeth 23 form resilient tongues, and can each deflect inwardly independently of each other, radially in relation to the rotational axis Y. In addition, the toothed wheel 16 is thinned out in the area of the first sections 24 on the inner periphery. This means that the teeth 23 in this area are provided less support on the inner periphery than in the area of the second section 26. In the second section 26, the teeth 23 are supported radially inside the tooth bases by a supporting ring 32.

In the example shown, the entire toothed wheel 16 is designed as a single piece, preferably out of plastic. This ensures the required elasticity of the first sections 24 of the teeth 23 in a radial direction. The first sections 24 of the teeth 23 are pressed radially inward by a certain degree when meshing with the teeth 23 of the pinion 14, which ensures that both side flanks of the teeth 23 in the first section 24 abut the tooth profiles of the pinion 14 free of play. However, the actual torque transfer between the pinion 14 and toothed wheel 16 continues to take place via the conventional tooth configuration in the second section 26 of the teeth 23, in which the commonly existing clearance remains present. Hence, the first sections 24 of the teeth 23 have a resiliency or damping function in the toothed gearing, which eliminates undesired noises. The first section 24 represents only a small area of the tooth width in the direction of the tooth longitudinal axis Z, in the case at hand approximately 20% of the tooth width, so that the majority of the tooth width in the second area 26 can be used for the transfer of forces.

In the example shown, the toothed wheel 16 is designed as a single piece made out plastic material. However, let it be understood that the toothed wheel 16 can also be fabricated out of various materials, in particular out of different plastics, for example by means of multi-component injection molding. For example, the teeth 23 in the first section 24 could be made out of another, in particular more elastic, material than the portion of the teeth 23 in the second section 26. It is also conceivable for the teeth in the second section 26 to consist of metal, and only of plastic in the first area 24. Several toothed wheels configured like a toothed wheel 16 could also be used in a multi-stage gearing.

While specific embodiments of the invention have been shown and described in detail to illustrate the application of the principles of the invention, it will be understood that the invention may be embodied otherwise without departing from such principles.

The invention claimed is:

1. A pump unit comprising:
   a drive having a drive motor;
   a toothed gearing, wherein the toothed gearing has a toothed wheel comprising teeth and a rotational axis;
   a pump cam and a pump positive-displacement body, wherein each tooth comprises:
      a longitudinal axis parallel to the rotational axis;
      a first tooth section; and
      an adjacent second tooth section, a cross section of the first tooth section of the tooth having an outer contour that projects in a partial area of the outer contour relative to a second section outer contour of the adjacent second section of the tooth, and the first tooth section is elastically designed and/or elastically mounted to the second tooth section;
   wherein the toothed wheel having the first and second sections of the teeth rotationally drives the pump cam to move the pump positive-displacement body, the first section of each tooth being separated from the first section of the adjoining teeth by slits, wherein the teeth of the first section are configured as resilient tongues, each of the teeth of the first section being independently movable radially inward with respect to the rotational axis,
   wherein the first section is movable in a radial direction, the first section extending in an axial direction from the second section, the slits extending parallel to the axial direction, the first section extending in the radial direction beyond an outer circumference of the second section; and
   wherein the respective teeth are configured such that that the first section of each tooth radially protrudes relative to the adjacent second section of the tooth, the first section having a first section tip diameter, the second section having a second section tip diameter, wherein the second section tip diameter is less than the first section tip diameter.

2. The pump unit according to claim 1, wherein the toothed gearing further comprises a pinion on a shaft of the drive motor, the toothed wheel having the teeth with the first and second tooth sections, wherein the teeth of the toothed wheel mesh with teeth of the pinion on the shaft of the drive motor.

3. The pump unit according to claim 1, wherein the drive motor is a stepping motor.

4. The pump unit according to claim 1, wherein the respective first section of the tooth lies at an axial end of the tooth.

5. The pump unit according to claim 1, wherein the first sections of several teeth lie on a shared circumferential line of the toothed wheel.

6. The pump unit according to claim 1, wherein the first section of each tooth has a front edge running at an inclination relative to said rotational axis of the toothed wheel.

7. The pump unit according to claim 1, wherein the first section is resiliently joined with the adjoining second section of the tooth.

8. The pump unit according to claim 1, wherein each tooth has a smaller wall thickness in the area of the first sections of the teeth in a radial direction than in the area of the second sections of the teeth.

9. The pump unit according to claim 1, wherein the teeth are made out of plastic.

10. The pump unit according to claim 1, wherein the respective first sections of the teeth are made out of plastic, and the respective second sections of the teeth are made out of metal.

11. The pump unit according to claim 1, wherein the first section extends over an area of 10% to 30% of a tooth width.

12. The pump unit according to claim 1, wherein said first tooth section protrudes radially outward relative to said adjacent second tooth section, wherein said first tooth section extends toward an axial side of said toothed wheel radially outward relative to said rotational axis of said toothed wheel.

13. A pump unit, comprising:
- a pump unit structure comprising a pump positive displacement body, a drive, a pump cam and a toothed gearing, said drive having a drive motor, wherein said toothed gearing is connected to said pump positive-displacement body for moving fluid, said toothed gearing comprising a toothed wheel, said toothed wheel comprising teeth and a rotational axis, wherein each tooth comprises:
  - a first tooth section comprising a first tooth section teeth and a first tooth section base, said first tooth section base extending in a direction transverse to said rotational axis, each of said first tooth section teeth extending, in an axial direction of said first tooth section base, from said first tooth section base to a position located at a spaced location from said first tooth section base, wherein said first tooth section teeth are patterned about said rotational axis in a circumferential direction at a spaced location from one another, said axial direction being parallel to the rotational axis, each one of said first tooth section teeth being configured to individually deflect relative to another one of said first tooth section teeth, wherein each of said first tooth section teeth is movable in a radial direction with respect to the rotational axis; and
  - a second tooth section located adjacent to said first tooth section base, wherein a cross section of said first section of the tooth radially protrudes relative to said adjacent second tooth section, and the first tooth section is elastically designed and/or elastically mounted to the second tooth section,
- wherein the first section is resiliently joined with the adjacent second section of the tooth, said first tooth section comprising a first tooth section outer tip diameter, said first tooth section outer tip diameter being defined by said first tooth section teeth, said second tooth section comprising a second tooth section outer tip diameter, said second tooth section outer tip diameter being less than said first tooth section outer tip diameter, wherein the toothed wheel having the first and second sections of the teeth rotationally drives the pump cam to move the pump positive-displacement body, said cam converting rotational movement of the toothed wheel into an axially oscillation motion.

14. The pump unit according to claim 13, wherein the first section of each tooth has a front edge running at an inclination relative to said rotational axis of the toothed wheel, wherein each of said first tooth section teeth is separated at the spaced location from another one of said first tooth section teeth via a slit, said slit extending parallel to said axial direction.

15. The pump unit according to claim 14, wherein said first tooth section extends toward an axial side of said toothed wheel radially outward relative to said rotational axis of said toothed wheel, wherein a portion of each of said first tooth section teeth is arranged at a radially spaced position from said second tooth section, said radially spaced position being located beyond an outer circumference of said second tooth section.

16. The pump unit according to claim 15, wherein each tooth has a smaller wall thickness in the area of the first sections of the teeth in a radial direction than in the area of the second sections of the teeth.

* * * * *